United States Patent
Roth et al.

(10) Patent No.: US 7,430,072 B2
(45) Date of Patent: Sep. 30, 2008

(54) SYSTEM AND METHOD FOR INCREASING IMAGE QUALITY IN A DISPLAY SYSTEM

(75) Inventors: Ronald Charles Roth, McKinney, TX (US); Timothy Joseph Hogan, Allen, TX (US); Lucius Sherwin, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 218 days.

(21) Appl. No.: 11/402,411

(22) Filed: Apr. 12, 2006

(65) Prior Publication Data

US 2007/0242343 A1  Oct. 18, 2007

(51) Int. Cl.
*G02B 26/00* (2006.01)
*B29D 11/00* (2006.01)
*G03C 5/00* (2006.01)

(52) U.S. Cl. ............... 359/291; 359/292; 359/298; 216/24; 430/321

(58) Field of Classification Search ......... 359/290–292, 359/295, 298, 321; 430/311, 319–322, 325; 438/52, 479, 611, 679, 685, 706; 216/2, 216/67, 79, 24, 101; 353/30
See application file for complete search history.

(56) References Cited

U.S. PATENT DOCUMENTS

| | | | | |
|---|---|---|---|---|
| 5,830,529 | A * | 11/1998 | Ross .......................... | 427/152 |
| 6,618,186 | B2 * | 9/2003 | Kaeriyama ................. | 359/292 |
| 7,273,693 | B2 * | 9/2007 | Nikkel et al. ............... | 430/321 |

* cited by examiner

*Primary Examiner*—Loha Ben
(74) *Attorney, Agent, or Firm*—Charles A. Brill; Wade James Brady, III; Frederick J. Telecky, Jr.

(57) ABSTRACT

System and method for maximizing image quality by eliminating vias on a reflective surface. A preferred embodiment comprises depositing a first portion of a mirror surface over a support surface, applying a protective coating on the mirror surface, and then inverting the via. The preferred embodiment also comprises removing a portion of the inverted via and then depositing a second portion of the mirror surface. The remaining portion of the inverted via fills the via and provides a level surface for the depositing of the second portion of the mirror surface, reducing the amount of light scattered by the via.

17 Claims, 6 Drawing Sheets

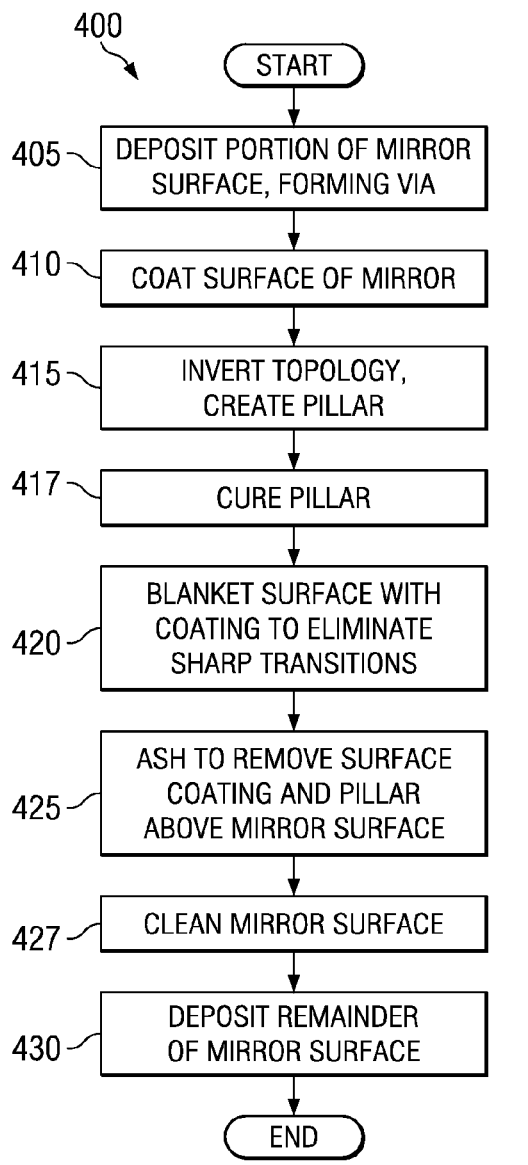
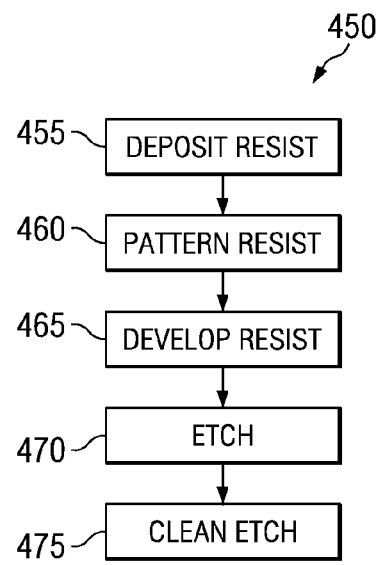
FIG. 4a
FIG. 4b
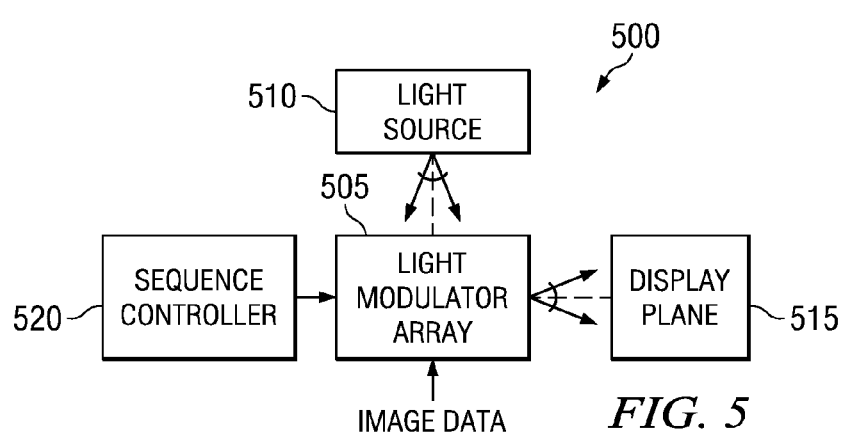
FIG. 5

SYSTEM AND METHOD FOR INCREASING IMAGE QUALITY IN A DISPLAY SYSTEM

TECHNICAL FIELD

The present invention relates generally to a system and a method for displaying images, and more particularly to a system and a method for increasing image quality by eliminating vias on a reflective surface.

BACKGROUND

In microdisplay-based display systems used to display images by projecting the images onto a display plane, the contrast ratio of the display system has a significant impact on the perceived quality of the system. A display system's contrast ratio can be defined as a ratio of the brightest displayable gray scale (typically, pure white) to the darkest displayable gray scale (usually, pure black). The display of pure black can often be difficult to achieve in many display systems, since it is typically not feasible to simply turn off a light source used to display the images when there is a need to display the pure black. Rather, light from the light source is normally redirected so that the amount of light projected onto the display plane is minimized. Since it is not possible to turn off the light, it can be very difficult to achieve pure black.

In a display system that makes use of positional micromirror light modulators, the array of micromirror light modulators is commonly referred to as a DMD (digital micromirror device), wherein micromirrors are mounted on hinges and are arranged in an array. The micromirrors traverse along an axis to either reflect light from a light source onto the display plane or away from the display plane, dependent upon image data being displayed. When a micromirror is in a position to reflect light away from the display plane, there is still a possibility of scattered light from the micromirror and its underlying support structure (hinges, hinge supports, landing pads, electrical conductors, and so forth) to reach the display plane. The scattered light that reaches the display plane can lighten the darkest displayable gray scale and therefore reduce the contrast ratio of the display system.

The underlying support structure of the micromirror can be coated with an antireflective coating to help reduce the light scattering. However, since the micromirror must be able to reflect as much light as possible (to maximize the brightness of the display system), to coat the micromirror with an antireflective coating will only reduce the perceived quality of the images displayed by the display system.

With reference now to FIGS. 1a through 1d, there are shown diagrams illustrating an isometric view and a side, cross-sectional view of a typical micromirror 100 and several techniques to help reduce light scatter from a via present in the surface of the micromirror 100. The micromirror 100 is a planar mirror that has a four-sided shape, however, the shape and size of the micromirror 100 can be dependent upon the arrangement of the array of micromirrors in the DMD, as well as the desired density of the DMD, the fabrication process technology, and so forth. The micromirror 100 includes a via 105 that is part of the physical structure of the micromirror 100 and can be used to attach the micromirror 100 to a hinge (not shown).

Light (shown as light beam 110) from a light source (not shown) can strike the surface of the micromirror 100 and reflect (shown as light beam 111) with an angle of reflection that is equal to an angle of incidence. However, light that strikes the via 105 will tend to scatter (shown as small light beams 112 and 113). Although the surface area of the via 105 may be small compared to the surface area of the micromirror 100, the amount of light scattered by the via 105 can contribute to a decrease in the contrast ratio of the display system.

It is possible to reduce the amount of light scattered by the via 105 by reducing the surface area of the via 105, as shown in FIG. 1c. With a smaller surface area, a ratio of micromirror surface area to via surface area decreases, therefore, the percentage of scattered light to non-scattered light is reduced. Another possible solution that can be used to reduce the amount of light scattered by the via 105 is to place an antireflective coating 120 inside the via 105 so that light that enters the via 105 will tend to be absorbed by the antireflective coating 120 and not scatter, as shown in FIG. 1d. Another possible solution involves the deposition of a coating onto the mirror surface and the mirror surface can then be polished to remove the coating and leaving the coating over the via 105.

One disadvantage of the prior art is that reducing the surface area of the via 105 can result in making the formation of the physical structure of the micromirror more difficult. Furthermore, a reduction in the size of the via 105 may reduce the reliability of the attachment of the micromirror 100 to the hinge (reduced step coverage).

Another disadvantage of the prior art is that the placement of an antireflective coating 120 into the via 105 can be hard to control and some of the antireflective coating can end up deposited onto the surface of the micromirror 100 or the via 105 may not be fully coated, resulting in either a loss of brightness or scattered light.

Yet another disadvantage of the prior art is that the polishing of the mirror surface to remove the coating can remove some of the material of the mirror surface, thereby potentially damaging the mirror surface. Additionally, the removal of the material of the mirror surface can weaken the mirror surface, making the mirror open to damage during use.

SUMMARY OF THE INVENTION

These and other problems are generally solved or circumvented, and technical advantages are generally achieved, by preferred embodiments of the present invention which provides a system and a method for increasing image quality by eliminating vias on a reflective surface.

In accordance with a preferred embodiment of the present invention, a method for fabricating a via-free mirror in a spatial light modulator is provided. The method includes depositing a first portion of a mirror surface over a support layer, where the support layer includes a via, and applying a protective coating over the mirror surface. The method also includes inverting the via and removing a portion of the inverted via. The method further including depositing a second portion of the mirror surface.

In accordance with another preferred embodiment of the present invention, a method for fabricating a micromirror light modulator is provided. The method includes patterning a support layer on a hinge, where the support layer includes a via, and depositing a first portion of a mirror surface over the support layer. The method also includes applying a protective coating on the mirror surface, inverting the via, and removing the inverted via. The method further including depositing a second portion of the mirror surface and etching away the support layer.

In accordance with another preferred embodiment of the present invention, a display system is provided. The display system includes an array of light modulators optically coupled to a light source and a controller coupled to the array of light modulators. The controller issues commands to control the operation of the array of light modulators. The array of light modulators creates images by setting each light modulator in the array into a state needed to properly display the image on a display plane. Each light modulator includes a mirror that includes a pad coupled to a hinge of the light modulator, a first layer of the mirror coupled to the pad by an arm and a second layer of the mirror that completely covers the first layer of the mirror and the arm. The arm allows the mirror to pivot about the hinge.

An advantage of a preferred embodiment of the present invention is that the vias on the surface of the mirrors are completely filled, which will maximize the brightness of the display system. Additionally, no material from the mirror surface needs to be removed. The removal of material from the mirror can weaken the mirror, making the mirror prone to damage over use. Furthermore, the removal of the material from the mirror can damage the support structure of the mirror.

Yet another advantage of a preferred embodiment of the present invention is that larger mirror vias can be created. The larger via can improve the step coverage, which can yield more reliable mirrors, without compromising contrast ratio (due to the larger via surface area to mirror surface area ratio).

A further advantage of a preferred embodiment of the present invention is that the coverage of the vias is consistent across multiple mirrors, multiple dies, and multiple wafers, which will yield a more consistent contrast ratio for arrays of light modulators manufactured in the same fabrication line. This results in a more consistent level of performance for display systems utilizing the arrays of light modulators.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a and 4b are diagrams of a sequence of events in the fabrication of a mirror of a micromirror light modulator and an optional sequence for placing holes in a via in the mirror, according to a preferred embodiment of the present invention; and FIG. 5 is a diagram of a display system, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely the fabrication of a mirror surface of a micromirror light modulator for use in display systems. The invention may also be applied, however, to other surfaces wherein there is a desire to fill in vias and holes present on the surface.

Figure 1A:
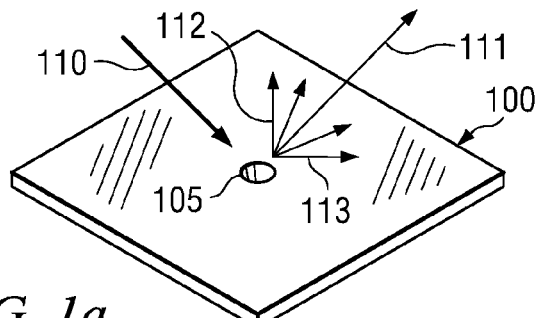
FIGS. 1a through 1d are diagrams of several views of a micromirror as well as several techniques used to help reduce light scatter from a via present in the surface of the micromirror.
Figure 1B:
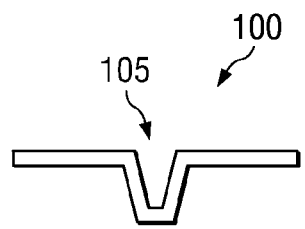
Figure 1C:
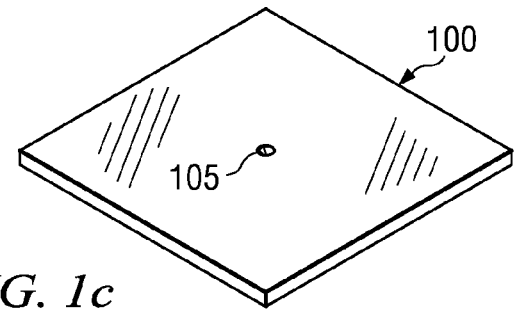
Figure 1D:
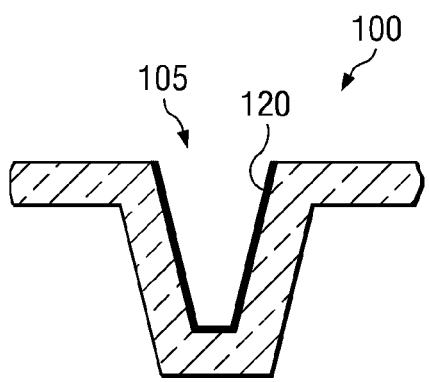
Figure 2A:
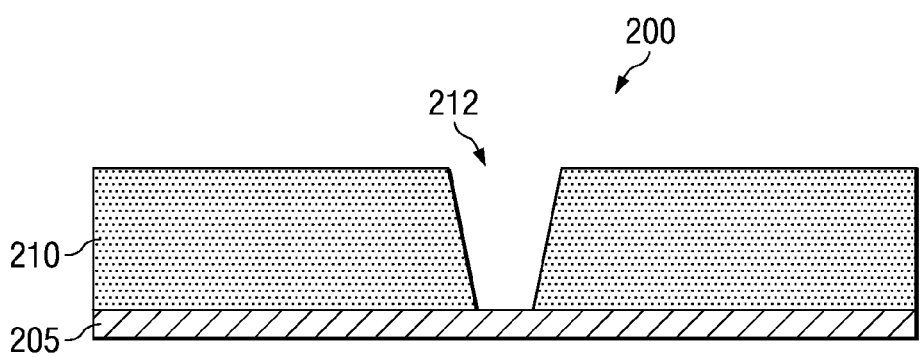
FIGS. 2a through 2j are diagrams of a micromirror light modulator during fabrication of the micromirror light modulator, according to a preferred embodiment of the present invention.

With reference now to FIGS. 2a through 2j, there are shown diagrams illustrating exemplary cross-sectional views of a micromirror light modulator 200 during the fabrication of the micromirror light modulator 200, wherein a via on the surface of a mirror of the micromirror light modulator 200 is eliminated to maximize reflectivity of the mirror, according to a preferred embodiment of the present invention. In practice, the micromirror light modulator 200 would be one of a plurality of micromirror light modulators arranged in an array of light modulators, forming a DMD. The diagram shown in FIG. 2a illustrates the micromirror light modulator 200 comprising a hinge 205 and an underlying support layer 210. The underlying support layer 210 is used to create the mirror of the micromirror light modulator 200. The mirror of the micromirror light modulator 200 is formed on top of the underlying support layer 210 in a subsequent fabrication step. The underlying support layer 210 includes a via 212 that is open clear to the hinge 205.

According to a preferred embodiment of the present invention, the via 212 is located at the center of the underlying support layer 210 and is sufficiently large in size to enable secure attachment of the mirror of the micromirror light modulator 200 to the hinge 205. It is possible to use multiple vias that are not located at the center of the underlying support layer 210 in place of the centrally located via 212. However, the use of more than one via can cause even a greater decrease in the contrast ratio of the display system using the DMD, since the multiple vias can scatter a greater amount of light.

Figure 2B:
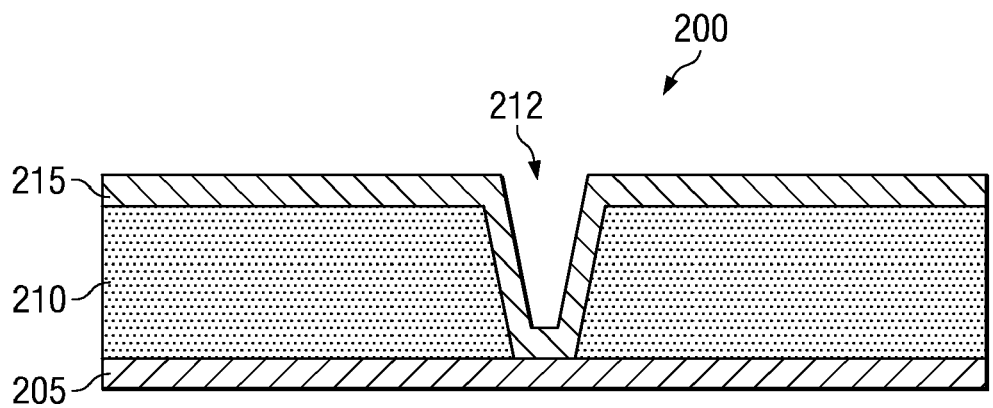

The diagram shown in FIG. 2b illustrates a mirror 215 formed on top of the underlying support layer 210. The mirror 215 can be formed from a material such as aluminum and can be formed using deposition techniques. Other materials, such as tungsten, silicon, or titanium, can be used in place of aluminum. According to a preferred embodiment of the present invention, the deposition of the aluminum should be made using a deposition technique that will ensure a maximum coverage of the walls of the via 212. The covered wall of the via 212 can be used as an attachment to connect the mirror 215 to the hinge 205. The via 212 should not be filled with aluminum (or the desired mirror material), but sufficient coverage of the walls of the via 212 is desired. This will provide for a robust attachment of the mirror 215 to the hinge 205. The amount of aluminum deposited on the underlying support layer 210 should be adequately thick to ensure that the mirror 215 will not be damaged in subsequent processing, while ensuring that sufficient thickness remains for a final deposition of aluminum. The amount of aluminum deposited should range from 40 to 60 percent of the overall desired mirror thickness, with a preferred thickness be approximately 50 percent.

Figure 2C:
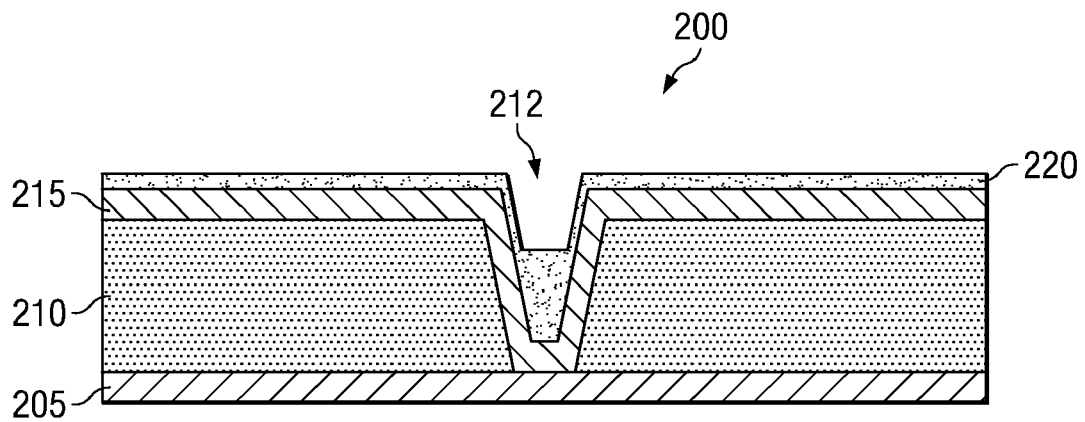

The diagram shown in FIG. 2c illustrates the formation of a protective layer 220 on top of the mirror 215. According to a preferred embodiment of the present invention, the protective layer 220 can be formed using a backside antireflective coating (BARC) material that may be applied over the mirror 215. The BARC can be applied over the mirror 215 via a spin coating technique, wherein the BARC, carried in a solvent, is applied to the center of a rotating wafer. The rotation of the wafer then distributes the BARC over the surface of the wafer. The use of the BARC material is not due to the antireflective properties of the material, but its ease of use, thermal stability properties, ability to fill the via 212, as well as the relative ease in removing the BARC material. A sufficient amount of the BARC material should be used to at least partially fill the via 212. In addition to at least partially filling the via 212, the protective layer 220 (made up of BARC material, for example) can protect the mirror 215 from damage in topology reversal processing.

An alternative to the use of BARC as the protective layer 220 can be a thin metal alloy that is deposited directly over the mirror 215. The thin metal alloy can provide similar protective properties as the BARC and protect the mirror 215 from damage in topology reversal processing. An advantage of the use of the thin metal alloy to form the protective layer 220 is that the deposition of the thin metal alloy can be deposited in situ, i.e., the thin metal alloy can be deposited over the mirror 215 in the same fabrication process that created the mirror 215. The use of the thin metal alloy as the protective layer 220 may not adequately planarize the surface of the mirror 215, however, subsequent layers formed during the topology reversal processing may provide needed planarization.

Figure 2D:
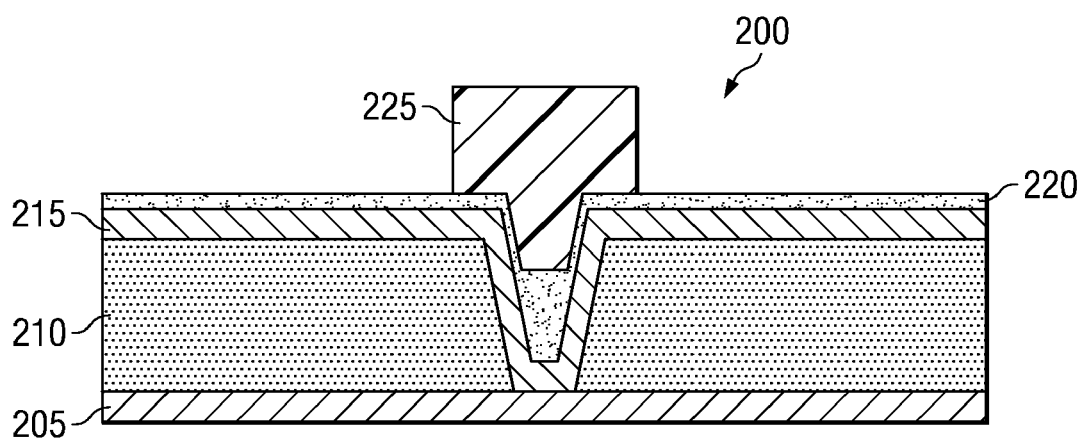

The diagram shown in FIG. 2d illustrates the micromirror light modulator 200 after the completion of a topology reversal operation. The topology reversal effectively replaces the via 212 with a pillar 225. One way to perform the topology reversal is to spin coat the micromirror light modulator 200 (spin coat the entire wafer containing the plurality of micromirror light modulators) with a resist material, such as a resist usable in I-line photolithography or a deep ultraviolet (DUV) resist. The low viscosity resist material may be preferred to enable the formation of as thin a coating of the resist as possible. After the spin coating of the resist material, the resist material can be patterned, wherein the pattern used to pattern the resist materials contains structures, such as the pillar 225, over the via 212. After patterning, the resist can be cleaned to leave the pillar 225 in place of the via 212. Afterwards, the pillar 225 can be cured, for example, with an ultraviolet light, a hot plate, and/or an oven to harden the pillar 225.

Figure 2E:
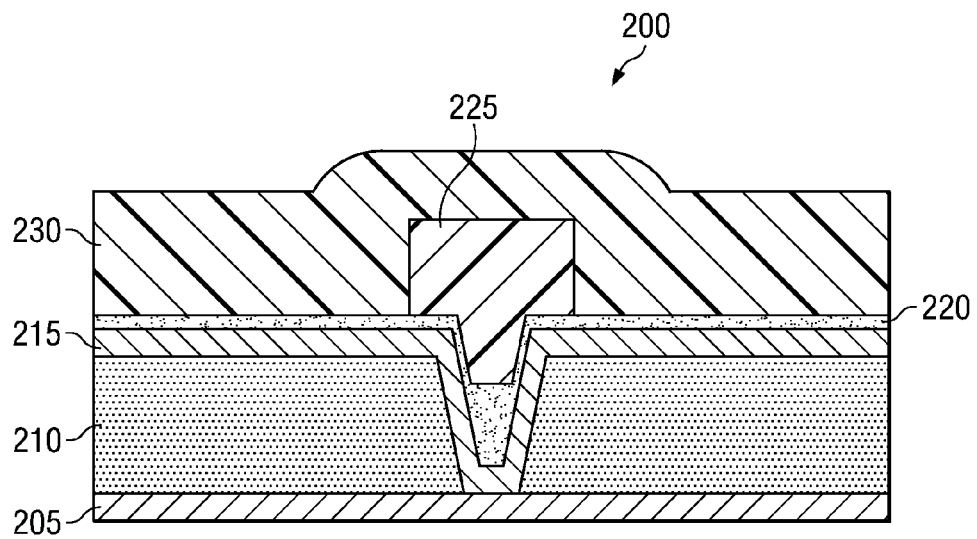

Ideally, portions of the pillar 225 above the mirror 215 can now be removed to leave a mirror 215 with the via 212 that is filled. However, the relatively sharp vertical edges of the pillar 225 can make the clean removal of the pillar 225 difficult without damaging the mirror 215. The diagram shown in FIG. 2e illustrates the deposition of a second resist layer 230 on the mirror 215. The second resist layer 230 may be formed from the same resist material as was used to create the pillar 225 or a different resist material can be used. For example, different resist materials can be used to achieve a thinner overall stack, better planarization, better pillar stability, and so on.

Figure 2F:
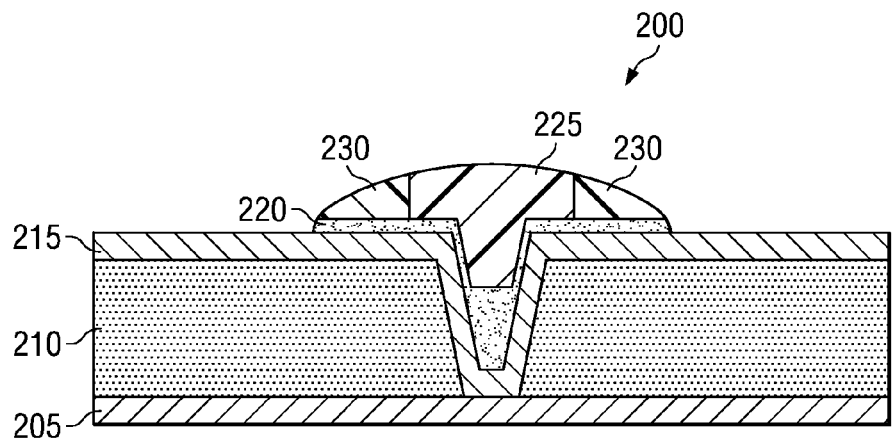

The diagram shown in FIG. 2f illustrates the micromirror light modulator 200 with a portion of the second resist layer 230, the pillar 225, and the protective layer 220 removed. The removal of the layers can be accomplished with an ashing operation, wherein the wafer containing the micromirror light modulator 220 can be put in an ash chamber and exposed to strongly oxidizing conditions. According to a preferred embodiment of the present invention, the conditions of the ashing chamber can be set so that the ash occurs uniformly across the wafer to ensure that the ash rate is approximately constant over the entire wafer surface. Furthermore, the ash process should use only oxygen ($O_2$) plasma in order to provide an easily controllable ash rate. The ashing operation can have two endpoints. A first endpoint is shown in FIG. 2f, wherein the ashing operation removes enough of the second resist layer 230 and the pillar 225 to expose the protective layer 220.

Figure 2G:
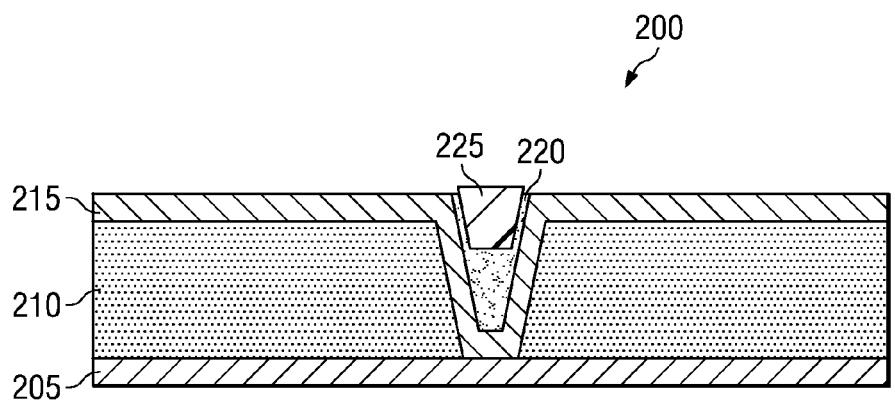

A second endpoint of the ashing operation occurs when the surface of the mirror 215 is exposed. The termination of the ashing operation can typically be specified by continuing to ash the surface of the mirror 215 for a period of time after the first endpoint has been detected. The diagram shown in FIG. 2g illustrates the second endpoint of the ashing operation. At the second endpoint, all of the second resist layer 230 and portions of the pillar 225 above the mirror 215, as well as the protective layer 220 not inside the via 212, are removed. According to a preferred embodiment of the present invention, a small portion of the pillar 225 above the mirror 215 is intentionally left in place.

Figure 2H:
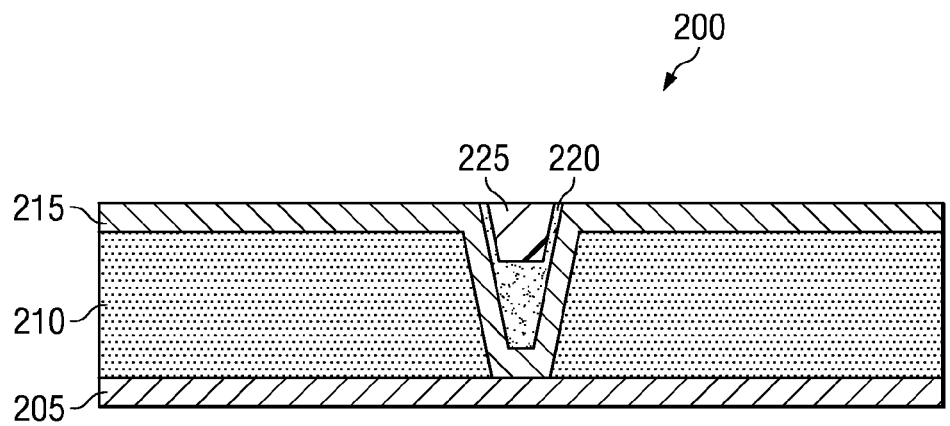

The micromirror light modulator 200 can then be cured by baking to cure the portion of the pillar 225 above the mirror 215. According to a preferred embodiment of the present invention, the baking of the pillar 225 cures the material of the pillar 225 and makes the pillar 225 resist sputtering that will occur when additional mirror material is deposited. Additionally, the baking also causes shrinkage of the pillar 225, bringing the pillar 225 level with the mirror 215. The diagram shown in FIG. 2h illustrates the micromirror light modulator 200 after the baking. Alternatively, the micromirror light modulator 200 can then be exposed to an ultraviolet light to cure the portion of the pillar 225 above the mirror 215.

Figure 2I:
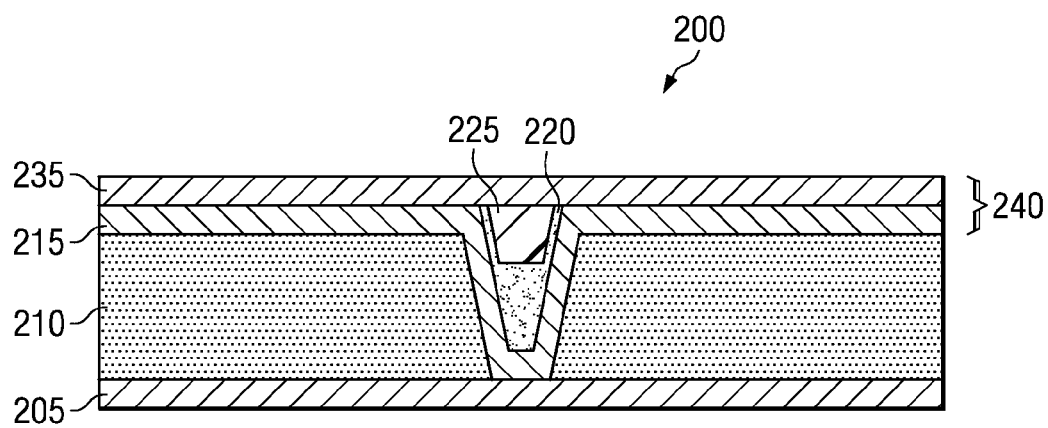
Figure 2J:
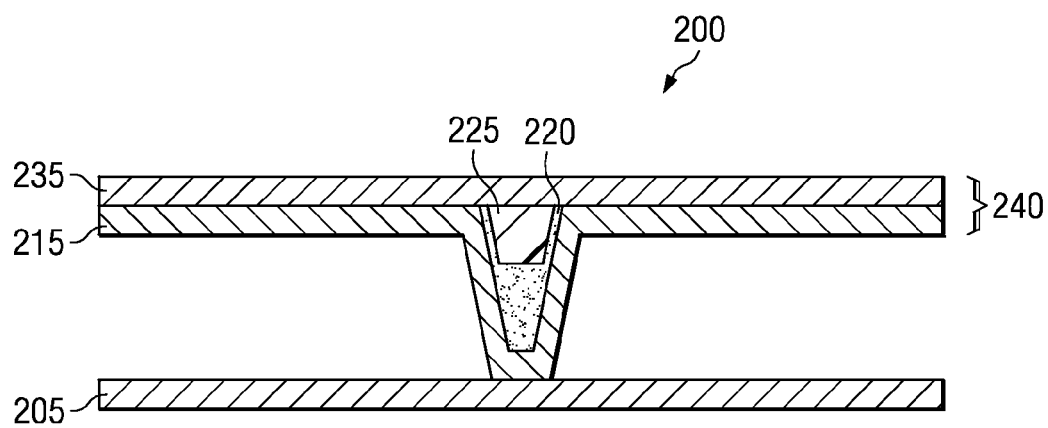

With the via 212 filled and the pillar 225 level with the mirror 215, a second mirror layer 235 of the mirror 215 can be deposited using the same deposition technique used to originally deposit the mirror 215. This forms the finished mirror 240. The preferred thickness of the second mirror layer 235 is approximately 50 percent the overall thickness of the mirror 240. Too great a thickness will mean that the mirror 240 may be too massive and can not move as quickly as it could, thereby hurting the performance of the display system. The diagram shown in FIG. 2i illustrates the micromirror light modulator 200 with the second mirror layer 235 formed over the mirror 215 and the via 212. The underlying support layer 210 can then be removed via an isotropic etch to free the mirror 240 of the micromirror light modulator 200 and enable the mirror 215 to rotate on its hinge 205. The diagram shown in FIG. 2j illustrates the micromirror light modulator 200 with the underlying support layer 210 removed.

Figure 3A:
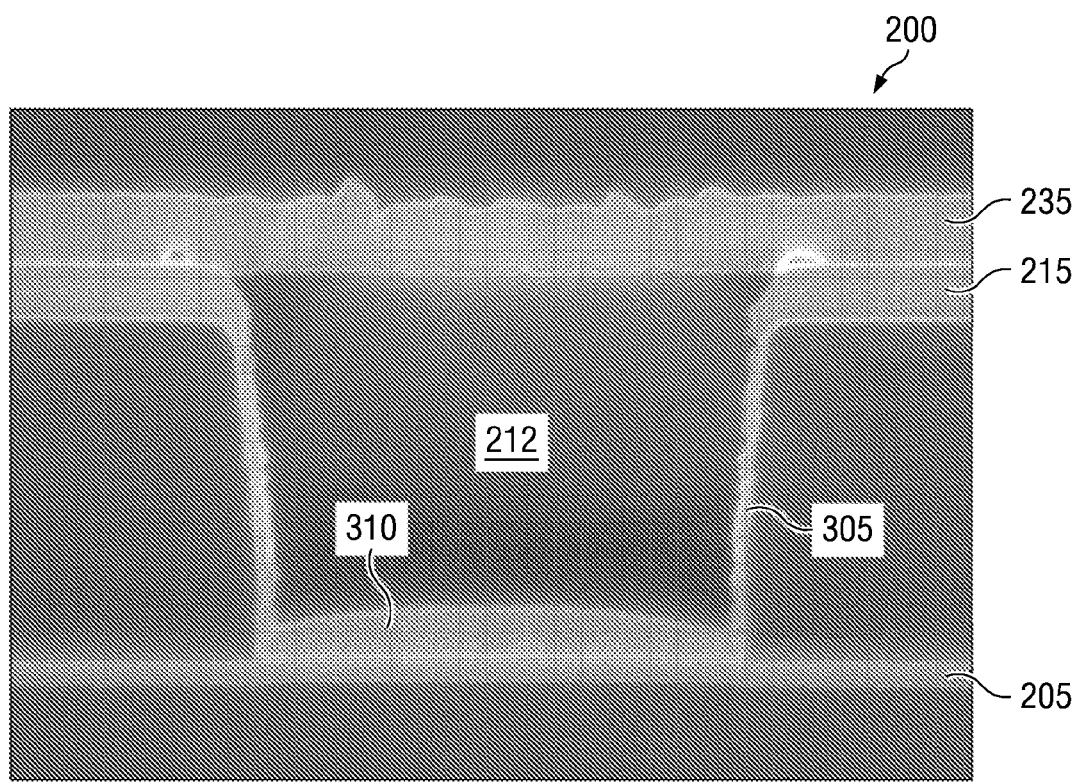
FIGS. 3a and 3b are micrographs of views of a mirror of a micromirror light modulator, according to a preferred embodiment of the present invention.
Figure 3B:

With reference now to FIGS. 3a and 3b, there are shown micrographs illustrating a cross-sectional view and an isometric view of a mirror 240 of a micromirror light modulator 200, according to a preferred embodiment of the present invention. The micrograph shown in FIG. 3a illustrates a cross-section view of the micromirror light modulator 200. Shown are the second mirror layer 235, the mirror 215, and the hinge 205. Not clearly visible in the micrograph are the pillar 225 and the protective layer 220 in the via 212. An arm 305, which is the portion of the mirror 215 that lined the wall of the via in the underlying support layer 210, includes a pad 310 wherein the mirror 215 attaches to the hinge 205. The arm 305 and the pad 310 are formed during the creation of the mirror 215 by depositing the mirror material over the underlying support layer 210. The micrograph shown in FIG. 3b illustrates an isometric view of the mirror 240. A roughened area 315 is a portion of the second mirror layer 235 immediately covering the via 212. The roughness of the roughened area 315 is due to the roughness of the pillar 225, with the roughness transferring through the second mirror layer 235 as the material of the second mirror layer 235 is deposited.

Additional deposition of the material of the second mirror layer 235 has not shown to decrease the roughness of the roughened area 315. In fact, the deposition of additional material can increase the size of the roughened area 315. Although the surface texture of the roughened area 315 is not as smooth as the surface texture of the remainder of the second mirror layer 235, the amount of light scattered by the roughened area 315 is significantly less than the amount of light scattered by the via 212. Measurements of actual micromirror light modulators have shown that the present invention has resulted in an increase in the contrast ratio by as much as 30 percent.

With reference now to FIGS. 4a and 4b, there are shown diagrams illustrating a sequence of events 400 in the fabrication of a mirror of a micromirror light modulator and an optional sequence of events 450 for placing holes in a via of a mirror of a micromirror light modulator, wherein a via in the mirror is eliminated, according to a preferred embodiment of the present invention. As discussed previously, the mirror of the micromirror light modulators features a via that is a result of the formation of the mirror over an underlying support structure while ensuring that the mirror is positively attached to a hinge. The sequence of events 400 describes a portion of the entire micromirror fabrication process, with events in the micromirror fabrication process occurring prior to the events illustrated in the sequence of events 400 and events occurring after the events illustrated in the sequence of events 400.

The fabrication of the mirror of a micromirror light modulator begins after the creation of an underlying support layer, which is used to provide a form for the deposition of the mirror (block 405). The underlying support layer includes a via that permits, when lined, the formation of an attachment used to attach the mirror to a hinge structure. According to a preferred embodiment of the present invention, aluminum is deposited on the underlying support layer in an advanced low pressure source (ALPS) chamber, for example, with a final thickness that is approximately 50 percent of an overall desired thickness of the mirror. The use of the ALPS chamber or another similar chamber to deposit the material used to create the mirror can allow for a greater lateral deposition of the material and permit better coverage of the walls of the via.

Once the mirror is formed and the wall of the via is coated, a protective coating can be applied to the surface of the mirror (block 410). According to a preferred embodiment of the present invention, the protective coating is used to protect the surface of the mirror from subsequent processing. Furthermore, depending on the material used, the protective coating can also partially or even completely fill the via. For example, if a BARC is used to form the protective coating, then the protective coating can function to completely fill the via as well as protecting the mirror surface. However, if a thin metal film deposited via deposition processes, then the protective coating will likely only function as a protective surface and not a planarizing surface nor to partially fill the via. A topology inversion process (block 415) can be used to reverse the via and create a pillar in its place. The topology inversion can be accomplished by forming a layer of a resist, for example, an I-line resist or a DUV resist, and then patterning the pillars over the vias, followed by a removal of portions of the resist not patterned.

After the topology inversion (block 415), it may be necessary to cure the pillars to harden them so that they will not be damaged by subsequent manufacturing processes (block 417). According to a preferred embodiment of the present invention, the curing can be performed with an ultraviolet light, a hot plate, an oven, and so forth. Since the removal of materials with sharp vertical transitions can be difficult, the mirror surface can be blanketed to eliminate a sharp vertical transition formed by the edges of the pillar (block 420). According to a preferred embodiment of the present invention, the same I-line resist (or some other resist material) can be used to form the blanket layer. However, since solvents used with resist materials will have an effect on other resist materials (the pillar), the pillar may need to be cured to prevent solvents present in the resist from dissolving the pillar.

The micromirror light modulator (along with other micromirror light modulators also formed on the semiconductor wafer) can then be placed in an ashing chamber to remove the blanket layer as well as the pillar (block 425). The ashing can occur in an oxygen rich atmosphere at elevated temperatures and low pressure. Since the thickness of the blanket layer and the pillar can vary between different semiconductor wafers, multiple endpoints can be used to determine the completion of the ashing operation. A first ashing endpoint occurs when the ashing reveals the protective layer formed over the mirror and a second ashing endpoint occurs when the mirror is revealed. According to a preferred embodiment of the present invention, the ashing operation terminates when all of the protective layer over the mirror has been removed and a small portion of the pillar remains above the mirror. This can be achieved by continuing the ashing operation for a period of time after the first endpoint is detected.

Contaminants and residue may remain on the surface of the mirror after the completion of the ashing operation (block 425). The further fabrication of the mirror without removing the contaminants and residue may result in a mirror surface that is not as smooth as possible, which can lead to the mirror scattering more light than necessary. Therefore, it may be necessary to remove the contaminants and residue by way of a cleaning process (block 427). According to a preferred embodiment of the present invention, the cleaning can be achieved by applying a developer solution onto the wafer and allowing the developer to sit on the wafer surface for a period of time prior to rinsing the developer away. The developer should be permitted to sit for a period of time that is less than what is required to damage the mirror surface. For example, an etch of the mirror surface can be performed for a short period of time. The short etch period can result in the removal of a very small amount of mirror surface, along with the contaminants and residue. An example of a developer would be a solution of tetramethyl ammonium hydroxide ($N(CH_3)_4OH$) in water. The tetramethyl ammonium hydroxide solution can completely dissolve the acid-rich exposed resist and moderately etch aluminum (with an etch rate of approximately 200 Angstroms/minute).

After the cleaning of the mirror surface (block 427), a curing operation can harden the remnants of the pillar as well as help shrink the pillar so that the pillar becomes substantially level with the surface of the mirror (if the shrinking is needed). The curing can be achieved through exposure with ultraviolet light or heat from an oven or hot plate, for example. Finally, a deposition of mirror material, such as aluminum, is performed to bring the thickness of the mirror to the desired level as well as cover the via (block 430). After the mirror is complete, the fabrication of the micromirror light modulator can continue.

If the micromirror light modulator is to undergo further processing which may involve high processing temperatures, material contained within a completely sealed via, such as the via 212 (FIG. 3a), when subject to elevated temperatures may produce gasses, thereby increasing the pressure within the sealed via 212. The increased pressure may produce an asymmetric force on the hinge 205 and cause the mirror to torque or tilt. The tilt can cause a larger distribution of landing voltages and potentially increase yield loss. If the pressure increases too much, the sealed via 212 may rupture.

It is possible to vent the pressure by creating a hole(s) in the sealed via 212, either on a top surface (such as in the roughened area 315 (FIG. 3b)) or a bottom surface of the sealed via 212 (such as in the pad 310 (FIG. 3a)) or even in the sides of the sealed via 212 (such as in the arm 305 (FIG. 3a)). Preferably, a single hole with a diameter ranging from 0.2 to 0.4 um can be placed in either the top surface or the bottom surface of the sealed via 212. Alternatively, a slit(s) with dimensions ranging from 0.2 to 0.4 um may be placed in the side of the sealed via 212. If the hole is to be placed in the bottom surface of the sealed via 212, the hole can be created after the deposition of a portion of the mirror surface (block 405) and before the coating the surface of the mirror (block 410) of the sequence of events 400. If the opening(s) (hole(s) or slit(s)) is to be made in the sides of the sealed via 212, the opening(s) can be created after the deposition of a portion of the mirror surface (block 405) and before or even after the coating of the surface of the mirror (block 410) of the sequence of events 400. If the hole is to be placed in the top surface of the sealed via 212, the hole can be created after the deposition of the remainder of the mirror surface (block 430).

Regardless of when the hole is created, the hole can be created using a substantially identical manufacturing process. The diagram shown in FIG. 4b illustrates a sequence of events 450 in the creation of a hole(s) in the sealed via 212, according to a preferred embodiment of the present invention. After the deposition of a portion of the mirror surface (block 405) or the deposition of the remainder of the mirror surface (block 430), a resist layer can be deposited (block 455). The resist layer can be deposited using a spin coat process, for example. After drying, the resist layer can be patterned using a mask layer that can have structures that are, depending on the type of resist used, either positive images or negative images of the holes to be created in the sealed via 212 (block 460). After patterning, the resist can be developed, such as with a developer solution, to remove unwanted parts of the resist layer (block 465).

A metal etch can then be performed to etch the hole(s) in the mirror surface (block 470). Alternatively, it can be possible to use the pattern develop process (block 465) to etch a small opening(s) in the sides of the sealed via 212. Once the hole (or opening) has been formed in the mirror surface, an etch clean can be performed to remove remnants of the etch process, such as the patterned resist, as well as any residue from the etch process (block 475). With the hole(s) created in the sealed via 212, the fabrication of the mirror of a micromirror light modulator can continue.

With reference now to FIG. 5, there is shown a diagram illustrating a display system 500, according to a preferred embodiment of the present invention. The array of light modulators 505 can be a DMD, wherein each light modulator in the DMD 505 comprises a mirror that includes a via, but the via has been eliminated (hidden). The individual light modulators in the DMD 505 assume a state that corresponds to image data for an image being displayed by the display system 500, wherein, depending upon the image data, an individual light modulator can either reflect light from a light source 510 away or towards a display plane 515. A combination of the reflected light from all of the light modulators in the DMD 505 produces an image corresponding to the image data. A sequence controller 520 coordinates the loading of the image data into the DMD 505, controlling the light source 510, and so forth.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for fabricating a via-free mirror in a spatial light modulator, the method comprising:
    depositing a first portion of a mirror surface over a support layer, wherein the support layer includes a via;
    applying a protective coating on the mirror surface;
    inverting the via;
    removing a portion of the inverted via; and
    depositing a second portion of the mirror surface.

2. The method of claim 1 further comprising after the inverting and before the removing, applying a blanket coat over the mirror surface and the inverted via.

3. The method of claim 2, wherein the removing comprises ashing until the protective coating is etched away from the mirror surface.

4. The method of claim 2, wherein a first resist material is used to invert the via and a second resist material used as the blanket coat, and the method further comprising after the inverting and before the applying of the blanket coat, curing the inverted via.

5. The method of claim 4, wherein the first resist material and the second resist material are selected from a group comprising: an I-line resist, and a deep ultraviolet resist.

6. The method of claim 1, wherein the inverting of the via comprises:
    applying a coating on the mirror surface;
    patterning the coating, wherein a pattern comprising a structure corresponding to the via is utilized; and
    removing a portion of the coating, leaving the structure to cover the via.

7. The method of claim 1, wherein the depositing of the first portion comprises depositing a layer of the mirror material substantially equal to 50 percent of a desired thickness for the mirror.

8. The method of claim 1 further comprising prior to the depositing of the second portion, curing the remainder of the inverted via.

9. The method of claim 1 further comprising the removing and prior to the depositing of the second portion, cleaning the mirror surface.

10. The method of claim 9, wherein the cleaning comprises:
applying a developer to the mirror surface;
waiting a specified period of time; and
removing the developer.

11. The method of claim 1 further comprising after the first depositing and before the applying, creating a hole in a bottom surface of the via.

12. The method of claim 1 further comprising after the first depositing and before the inverting, creating an opening in a side surface of the via.

13. The method of claim 1 further comprising after the second depositing, creating a hole in a top surface of the via.

14. A method for fabricating a micromirror light modulator, the method comprising:
patterning a support layer on a hinge, wherein the support layer includes a via;
depositing a first portion of a mirror surface over the support layer;
applying a protective coating on the mirror surface;
inverting the via;
removing the inverted via;
depositing a second portion of the mirror surface; and
etching away the support layer.

15. The method of claim 14, wherein the depositing of the first portion of the mirror surface is performed using a technique to ensure adequate coverage of walls of the via and to make a sufficiently strong connection with the hinge.

16. The method of claim 14 further comprising after the inverting and before the removing, applying a blanket coat over the mirror surface and the inverted via.

17. The method of claim 16, wherein the method further comprises after the inverting and before the applying of the blanket coat, curing the inverted via.

* * * * *